US005766714A

United States Patent [19]

Profetto et al.

[11] Patent Number: 5,766,714

[45] Date of Patent: Jun. 16, 1998

[54] OIL RESISTANT LABEL SYSTEM

[75] Inventors: Michael S. Profetto, Burr Ridge; Robert T. Wicks, Richton Park, both of Ill.

[73] Assignee: Gold Eagle Co., Chicago, Ill.

[21] Appl. No.: 593,495

[22] Filed: Jan. 30, 1996

[51] Int. Cl.[6] ........ B32B 7/12

[52] U.S. Cl. ........ 428/40.1; 40/299; 40/310; 283/81; 428/41.4; 428/41.5; 428/41.8; 428/42.2; 428/914

[58] Field of Search ........ 428/40.1, 41.4, 428/41.5, 41.8, 42.2, 914, 447; 40/299, 310; 283/81; 528/14, 15

[56] References Cited

U.S. PATENT DOCUMENTS

| | | | |
|---|---|---|---|
| 3,677,178 | 7/1972 | Gipe | 428/156 |
| 4,448,815 | 5/1984 | Grenoble | 427/387 |
| 4,504,549 | 3/1985 | Pines | 428/447 |
| 4,849,278 | 7/1989 | Stokes | 428/153 |
| 5,238,720 | 8/1993 | Volkman | 428/40 |
| 5,514,435 | 5/1996 | Suzuki | 428/40 |
| 5,587,214 | 12/1996 | Mitchell | 428/40.1 |
| 5,616,384 | 4/1997 | Goettmann | 428/36.1 |

FOREIGN PATENT DOCUMENTS

| | | |
|---|---|---|
| 63-186793 | 8/1988 | Japan . |

OTHER PUBLICATIONS

Document by General Electric Company entitled: GE Silicones SL6000 Solventless Release Coating System (date unknown) 3 pages.

*Primary Examiner*—Nasser Ahmad

*Attorney, Agent, or Firm*—Gerstman, Ellis & McMillin, Ltd.

[57] ABSTRACT

An adhesive coated label can be adherent to untreated polyolefin containers, and can be significantly oil resistant to avoid staining of the label if brought into contact with oil. The label comprises a label body of a clay-reinforced paper. The label body carries an adhesive layer on one side which preferably comprises from 0.3 to 10 weight percent of wood rosin or wood rosin ester, to provide a desired adhesion to polyolefin. A removable backing layer typically covers the adhesive layer before use. The backing layer has a release layer positioned against the adhesive layer, which comprises a silicone resin cross linked by the reaction of Si-H linkages with silanol or silicone-olefin linkages. The release layer may comprise a polypropylene sheet, particularly a polypropylene strip on which many labels are carried, to facilitate the manufacture and storage of the labels.

5 Claims, 1 Drawing Sheet

OIL RESISTANT LABEL SYSTEM

BACKGROUND OF THE INVENTION

This invention relates to a self adhesive label which is adherent to polyolefin containers, even containers that have not been pre-treated by corona discharge or by flame treatment. Also, the labels of this invention may be oil resistant, so that they do not stain and discolor in the presence of oils. This makes the labels particularly suitable for use on polyethylene or polypropylene blow molded containers for motor oil or the like, since the containers do not need to be pretreated, and the labels will not stain and discolor from spilled oil or the like.

Also this invention relates to a method of preparing, storing, and applying self-adhesive labels to the particularly polyolefin containers in an improved manner with reduced expense and reduced waste materials.

DESCRIPTION OF THE INVENTION

By this invention, an adhesive-coated label comprises the following:

A label body is provided, comprising a clay-reinforced paper for providing oil resistance. Typically, the clay is placed primarily on the printing side of the label body, as is conventional. Also, the term "paper" is not intended to exclude grades of fibrous sheeting which might be categorized as cardboard or the like. Typically, the paper used is the normal paper of the cellulose fiber variety.

The label body has one side, opposite to the printing side, which carries an adhesive layer. The adhesive layer may be generally conventional in its ingredients, modified as in this invention. The adhesive preferably is based on an acrylic ester such as 2-ethylhexyl acrylate or isooctyl acrylate as a major ingredient. However, adhesives based on poly (ethylene vinyl acetate) are also desirably used.

In accordance with this invention, the adhesives used for the adhesive layer comprise from 0.3 to 10 weight percent of rosin or rosin ester, which is a well-known material obtained from pine and related trees, plus equivalent materials derived from petroleum and the like. It has been found that the presence of rosin and/or rosin ester provides the greatly increased capacity to a variety of adhesives to adhere to untreated polyolefin surfaces of containers such as polyethylene or polypropylene blow molded containers. Such adhesives can be formulated with the use of such a percentage of rosin and/or its ester to provide labels that stick well to such containers without the need for a corona discharge pretreatment or flame treatment. Furthermore, such adhesives tend to continue to hold their adhesion even in the presence of spilled oil falling over the label itself after adhesion. It is, of course, preferred for the initial application of the label to be performed on a clean polyolefin surface of the container.

Furthermore, the clay-reinforced paper provides a significant oil resistance, as is known, so that the label is not discolored or stained during use of the product from the container.

Additionally, the label, prior to application to the container, carries a backing layer over the adhesive layer. The backing layer has a release layer which is positioned against the adhesive, the release layer comprising a silicone resin which is crosslinked by the reaction of silicon-hydrogen linkages of one polymeric moiety with silanol (Si—OH) or silicon-olefin linkages (such as silicon-vinyl linkages). As is known from various prior art including Grenoble et al., U.S. Pat. No. 4,448,815. This reaction is catalyzed with platinum or rhodium, for example, and results in a crosslinking reaction to form a crosslinked resin.

A remarkable advantage the use of such a release layer in this invention is that such release layers exhibit a much longer shelf life than other release layers including other known silicone release layers in the presence of the adhesives used in this invention. With other release layers, the backing layer can become permanently stuck to the label in a matter of days, while the release layer and backing layer in accordance with this invention permit the easy separation from labels, so that the label may be used over a period of weeks and more.

The release layer used in this invention may be a polypropylene sheet although paper release layers or other plastic layers, all coated with the desired silicone resin described above, may be used as well.

Furthermore, by this invention, a continuous strip of clay-coated paperstock from which the label body may be cut, is advanced to an adhesive application station, where the adhesive is applied on one side of the paper label strip. Adhesive may be applied as a water emulsion, free of organic carrier solvents that evaporate as the adhesive dries.

Then, a polypropylene continuous strip, coated with the silicone release coating used in this invention may then be joined with the continuous label body strip, with the adhesive layer and the release layer abutting together.

The joined, laminated continuous strips are advanced across a label cutter roller, where the particular labels are cut from the strip of label body material, without cutting the continuous polypropylene backing strip. Then, if desired, the laminated, continuous strips can be wound into a roll for storage.

A polypropylene backing strip exhibits great advantage because of its high strength, which reduces the downtime in automated process because of strip breakage. Likewise, after the rolled, laminated strips have been unrolled and the labels removed for use, the remainder of the label body strip can be removed, and the polypropylene strip or continuous webbing can be reused, optionally with a reapplication of the silicone release layer and heat curing if desired. A substantial saving is provided here, because the silicone resin coated strips are subject to special disposal regulations from the Environmental Protection Agency. This provides added reason for the desirability of reuse, while paper backing strips and the like are less capable of reuse.

Also, the application of labels to their containers is facilitated by retaining them on a polypropylene strip, in that they may be presented one by one in an accessible position by winding the polypropylene backing strip through a zone where the cut labels are presented for application to containers.

DESCRIPTION OF SPECIFIC EMBODIMENTS

Figures 1, 2:
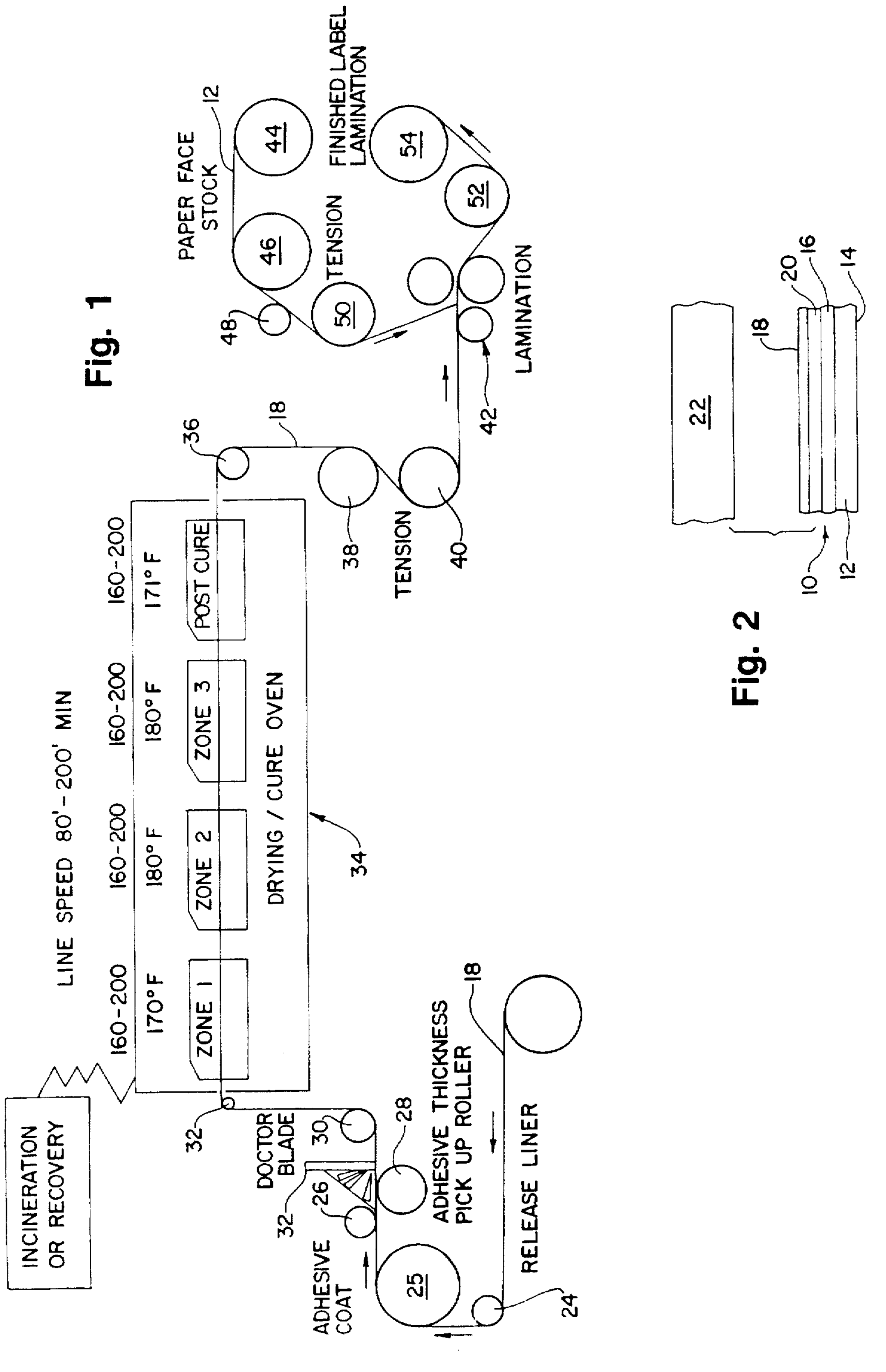
FIG. 1 is a schematic view of a process for manufacturing the label of this invention.
FIG. 2 is an enlarged, sectional view of the label, and a portion of a container to which the label may be attached.

Referring to the drawings, label 10 may comprise a paper face stock layer 12 which is preferably a 35 to 75 pound label stock which has a clay coating on the side 14 of the label which receives the printing. The clay coating used may comprise a hydrated aluminum silicate such as kaolin, kaolinite, montmorillonite, attapulgite, illite, bentonite, halloysite, and the like of suitable quality, particle size, and color for proper paper smoothness and surface to receive the desired ink colors during the printing process. Also, such label stock and exhibits a significant oil resistance, as is desirable for the label of this invention.

The clay coated face stock label 12 may contain binders such as hydrophilic polyacrylate and pulp fibers. A suitable base stock for the label has been manufactured by the James River Mills as 60 pound HP label stock.

Label 12 carries a water based adhesive 16, preferably containing EVA (poly)ethylene-vinyl acetate) and/or acrylic ester latex prior to application to label 12 and drying, to provide a permanent adhesive bonding agent essentially free of organic solvents before and after application. The latex adhesive may also contain emulsified (prior to application) tackiness agents to assure a rapid grip while the permanent adhesive sets, plus emulsifying agents, thickeners, and the like. One such permanent water based adhesive has been sold by the Dyna-Tech Adhesive Company Inc. of Grafton, West Virginia 26354, under the title Gold Eagle Water Based Adhesive. Such an adhesive can provide 95 to 100 percent fiber tear upon removal of the label off of a polyolefin surface, such as polyethylene which has not been flame treated or corona discharge treated, but which retains its original, low energy surface.

Suitable adhesive water emulsions for use in this invention may be formed by admixing an emulsified adhesive such as natural rubber, cis 1,4-polyisoprene block copolymers of polystyrene and polyisoprene such as Kraton brand elastomer, poly (styrene-butadiene) random co-polymers, polyisobutylene and butyl rubbers, homopolymers of isobutylene, vinyl acetate co-polymers, and the like may be used. Also, as previously stated, EVA copolymers and polyacrylate esters provide particularly good results.

Two examples of adhesives which may be emulsified with water or, if desired, mixed with organic solvents, may be applied to the labels of this invention, to form adhesive layers upon drying.

| | | |
|---|---|---|
| A) | 2-Ethylhexyl Acrylate | 74.5% w/w |
| | Vinyl Acetate | 20.0% |
| | Acrylic Acid | 4.0% |
| | N-Methylacrylamide | 1.0% |
| | Hydrogenated Pentaerythritol Rosin Ester (By the Nevil Chemical Company of Pittsburgh, PA) | 0.5% |
| B) | Isooctyl Acrylate | 95.0% |
| | Acrylic Acid | 4.5% |
| | Hydrogenated Pentaerythritol Rosin Ester | 0.5% |

The adhesive coated label 12 is covered with a release liner 18 which is preferably made of polypropylene or another strong polyolefin, but may be made of paper if desired. A particular advantage of polypropylene and equivalent materials lies in the fact that the material may be recycled to cover other labels after use with the same release liner, particularly where the label with release liner 18 is used in a manufacturing process, so that the polyolefin backing 18 is recoverable and applied to a new set of labels 12, after the original labels have been applied to containers on a manufacturing line. Thus, substantial savings of polyolefin (or perhaps heavy paper as a substitute) may be achieved by this reuse.

Release liner 18 is coated with typically a silicone release layer 20. Typically, a suitable silicone release layer is the General Electric SL6000 solventless release coating system, which comprises a platinum cured silicone polymer having silicon-hydrogen linkages which cross link. Some other silicone systems tend to permanently adhere to the preferred adhesive coating 16 used herein. Alternatively, certain fluorinated polymers may be selected for use as the release coating 20.

Preferably, the polyolefin backing layer 18 is biaxially oriented for increased strength.

Adhesive 16 may be applied to paper label stock 12, and silicone layer 20 may be applied to polypropylene backing 18 with conventional coating equipment. Following drying of layer 16 and heat treatment of layer 20 in accordance with the well known criteria (for example about 120° C. in a zoned oven, with a platinum concentration of 75 ppm as recommended by the manufacturer), the label lamination 10 is assembled. Polypropylene backing 18 may be a continuous strip carrying a series of labels 12 and their adhesive layers 16.

Then, label 12 may be removed from backing layer 18, 20 and applied to the outer wall of a polyethylene container 22, which outer wall has not been pretreated by corona discharge or the like for adhesive compatibility. Such a label does not discolor in an unsightly manner if it comes into contact with oil, as is of course likely if the container is used for holding oil or some related material.

As another advantage, by this invention, no appreciable volatile organic solvents need to be present in the manufacturing process, which greatly simplifies the safety and environmental measures which must be taken during manufacture, for a reduction in the cost of the final product.

Referring to FIG. 1, a process for the manufacture of laminated label 10 is disclosed.

A roll of the polypropylene backing strip or release liner web 18 is unrolled about various rollers 24, 30. A doctor blade 32 is used with a conventional system for applying the silicone release coating 20 to release liner web 18. Release liner web 18 bends about rollers 30 and 32 to enter a drying and curing oven 34. Oven 34 has four zones as shown with steps of drying and curing temperatures ranging between 170° F. and 180° F., as shown. The line speed can be 80–200 ft/min.

Web 18 passes around roller 36 and through tensioning roller system 38, 40 to a laminating area 42. Clay-coated paper face stock label strip 12 passes over rollers 44, 46 to an adhesive application roller 48. Paper strip 12 is then directed by roller 50 through the lamination system 42, where it is joined with backing strip 18.

A cutter roller 52 is then provided to cut the paper label and its adhesive 16 into individual, cut labels, without cutting the backing strip 18, or removal of the cut labels from the backing strip. Then, finally, the backing strip 18 and the carried labels are wound into a roll 54, pending their use by application to containers.

As a further advantage, the use of a polypropylene backing strip 18 greatly reduces the down time for strip breakage because of the high strength of polypropylene. Also, the product rolls 54 can contain more labels at a comparable diameter because the polypropylene backing strip 18 can be thinner than the strong paper backing strips that might be used as a substitute therefor. Also, because of the polypropylene backing strip, it becomes possible for the entire system to run faster with more die pressure and the like without breaking the polypropylene. Typically, a polypropylene backing 18 used in this invention may have a thickness of about 0.002 inch, while the prior art paper backings are about 0.035 inch in thickness.

Upon reuse of the backing strip 18, the silicone application and heat curing can be eliminated.

When needed for use, the laminated paper roll 44 can be unrolled at a site where the various labels 10 are removed from strips 12, 18 and applied to containers 22, as indicated in FIG. 2. Alternatively, backing strip 18 may be the size of adhesive coated label 12, and the respective labels and backings 18 may be separate from each other.

The above has been offered for illustrative purposes only, and is not intended to limit the scope of the invention of this application, which is as defined in the claims below.

That which is claimed:

1. An adhesive coated oil-resistant label which comprises:

a label body comprising a clay-reinforced paper, said label body having one side which carries a permanent adhesive layer which comprises a major component of an acrylic ester or poly(ethylene-vinyl acetate) and from 0.3 to 10 weight percent of rosin or rosin ester;

and a polypropylene sheet removable backing layer covering said adhesive layer, said backing layer having a release layer positioned against said adhesive layer, said release layer comprising a silicone resin cross-linked by the reaction of Si-H linkages with silanol or silicon-olefin linkages.

2. The adhesive coated label of claim 1 in which more than one label body is carried on said polypropylene sheet backing layer.

3. The label of claim 2 in which said adhesive layer is formed from a water-based emulsion.

4. The label of claim 3 in which said adhesive layer is essentially free of organic carrier solvents.

5. The label of claim 1 in which said adhesive layer contains from 0.5 to 2 weight percent of hydrogenated rosin ester.

* * * * *